(12) United States Patent
Sato

(10) Patent No.: US 9,843,496 B2
(45) Date of Patent: Dec. 12, 2017

(54) COMMUNICATION SYSTEM, CONTROL APPARATUS, AND NETWORK TOPOLOGY MANAGEMENT METHOD

(71) Applicant: NEC Corporation, Tokyo (JP)

(72) Inventor: Shihomi Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 197 days.

(21) Appl. No.: 14/758,474

(22) PCT Filed: Jan. 20, 2014

(86) PCT No.: PCT/JP2014/050896
§ 371 (c)(1),
(2) Date: Jun. 29, 2015

(87) PCT Pub. No.: WO2014/112612
PCT Pub. Date: Jul. 24, 2014

(65) Prior Publication Data
US 2015/0334001 A1    Nov. 19, 2015

(30) Foreign Application Priority Data
Jan. 21, 2013  (JP) ................................ 2013-008132

(51) Int. Cl.
*H04L 12/28*    (2006.01)
*H04L 12/751*   (2013.01)
(Continued)

(52) U.S. Cl.
CPC .......... *H04L 45/02* (2013.01); *H04L 12/6418* (2013.01); *H04L 41/12* (2013.01);
(Continued)

(58) Field of Classification Search
CPC combination set(s) only.
See application file for complete search history.

(56) References Cited

U.S. PATENT DOCUMENTS

| 5,715,396 A | 2/1998 | Chatwani et al. |
| 8,547,977 B2 | 10/2013 | Song et al. |

(Continued)

FOREIGN PATENT DOCUMENTS

| EP | 2 824 877 A1 | 1/2015 |
| JP | 2008-172381 A | 7/2008 |

(Continued)

OTHER PUBLICATIONS

Huang et al, Design and Implementation of an Automatic Network Topology Discovery System for the Future Internet Across Different Domains, IEEE, 6 pages, 2012.*
Japanese Office Action dated Apr. 12, 2016 with an English translation thereof.
Open Networking Foundation Mar. 2012 Interoperability Event Technical Paper, Apr. 19, 2012, URL, https://www.opennetworking.org/images/stories/downloads/sdn-resources/onf-specifications/openflow-test/onf-testing-interop-march-2012-tech-doc-v1.0.pdf.

(Continued)

*Primary Examiner* — Frank Duong
(74) *Attorney, Agent, or Firm* — McGinn IP Law Group, PLLC.

(57) ABSTRACT

A communication system includes: a control apparatus configured to set control information, which causes each control target switch to distinguish a link layer discovery protocol packet of a first network from a link layer discovery protocol packet of a second network different from the first network and to perform corresponding predetermined processing, in each control target switch; a group of switches each of which is configured to transmit a link layer discovery protocol packet of the first network to a predetermined topology management apparatus in accordance with control information set by the control apparatus; and a topology management apparatus configured to manage a network topology configured by the group of switches on the basis of information included in a link layer discovery protocol packet of the first network received from each of the switches.

20 Claims, 15 Drawing Sheets

(51) Int. Cl.
*H04L 12/721* (2013.01)
*H04L 12/64* (2006.01)
*H04L 12/24* (2006.01)
*H04L 12/26* (2006.01)

(52) U.S. Cl.
CPC ............ *H04L 45/26* (2013.01); *H04L 43/026* (2013.01); *Y02B 60/43* (2013.01)

(56) References Cited

U.S. PATENT DOCUMENTS

| | | | |
|---|---|---|---|
| 9,001,827 | B2 | 4/2015 | Appenzeller |
| 9,094,285 | B2 * | 7/2015 | Gorkemli ................. H04L 41/12 |
| 9,130,870 | B1 * | 9/2015 | Swierk ..................... H04L 45/46 |
| 9,374,285 | B1 * | 6/2016 | Ramasubramanian . H04L 41/12 |
| 2006/0245401 | A1 | 11/2006 | Fischer et al. |
| 2007/0041377 | A1 | 2/2007 | Song et al. |
| 2012/0155467 | A1 | 6/2012 | Appenzeller |
| 2012/0307659 | A1 | 12/2012 | Yamada |
| 2015/0009828 | A1 | 1/2015 | Murakami |

FOREIGN PATENT DOCUMENTS

| | | |
|---|---|---|
| JP | 2012-175394 A | 9/2012 |
| RU | 2 378 795 C2 | 1/2010 |
| WO | WO 2005/004398 A1 | 1/2005 |
| WO | WO 2012/082988 A1 | 6/2012 |

OTHER PUBLICATIONS

"A Design and Implementation of OpenFlow Controller Handling IP Multicast with Fast Tree Switching," 2012 IEEE/IRSJ 12th International Symposium on Applications and the Internet (SAINT), Jul. 20, 2012.
"Energy Efficient Minimum Spanning Tree in OpenFlow Networks," 2012 European Workshop on Software Defined Networking (EWSDN), Oct. 26, 2012.
Korean Office Action dated Dec. 19, 2016 with an English translation of the Japanese translation thereof.
Extended European Search Report dated Aug. 19, 2016.
Russian Decision of Grant dated Jun. 2, 2016 with an English translation thereof.
International Search Report (ISR) (PCT Form PCT/ISA/210), in PCT/JP2014/050896, dated Apr. 22, 2011.
Nick McKeown, and seven others, "OpenFlow: Enabling Innovation in Campus Networks," [online], [searched on Nov. 24, 2012], Internet <URL:http://www.openflow.org/documents/openflow-wp-latest.pdf>.
"OpenFlow Switch Specification" Version 1.3.1 (Wire Protocol 0-04), [online], [searched on Dec. 11, 2012], Internet <URL: https://www.opennetworking.org/images/stories/downloads/specification/openflow-spec-v1.3.1.pdf>.

* cited by examiner

FIG. 4

| MATCH CONDITIONS (Match fields) | FLOW STATISTICAL INFORMATION (Counters) | INSTRUCTIONS (Instructions) |
|---|---|---|
| USER-TRAFFIC FLOW ENTRY (INCLUDING LLDP PACKET FROM ANOTHER NETWORK) | ... | ... |
| ... | | |
| FLOW ENTRY FOR PROCESSING TOPOLOGY-DETECTION PACKET OF FIRST NETWORK MATCH CONDITIONS (ETHERNET TYPE = 88CC (LLDP) & IDENTIFICATION FLAG = 1, INSTRUCTIONS = FORWARDING TO CONTROL APPARATUS) | | |
| ... | | |

COMMUNICATION SYSTEM, CONTROL APPARATUS, AND NETWORK TOPOLOGY MANAGEMENT METHOD

REFERENCE TO RELATED APPLICATION

This application is based upon and claims the benefit of the priority of Japanese Patent Application No. 2013-008132 filed on Jan. 21, 2013, the disclosure of which is incorporated herein in its entirety by reference thereto.

The present invention relates to a communication system, a control apparatus, and a network topology management method. In particular, it relates to: a communication system which includes a plurality of switches and a control apparatus that controls these switches in a centralized manner; a control apparatus; and a network topology management method.

BACKGROUND

In NPLs 1 and 2, a technique referred to as OpenFlow has been proposed. OpenFlow recognizes communications as end-to-end flows and performs path control, failure recovery, load balancing, and optimization on a per-flow basis. Each OpenFlow switch according to NPL 2 has a secure channel for communication with an OpenFlow controller and operates according to a flow table suitably added or rewritten by the OpenFlow controller. In the flow table, a set of the following three is defined for each flow: match conditions (Match Fields) against which a packet header is matched; flow statistical information (Counters); and instructions that define at least one processing content (see section "5.2 Flow Table" in NPL 2).

For example, when an OpenFlow switch receives a packet, the OpenFlow switch searches the flow table for an entry having a match condition that matches header information of the received packet (see "5.3 "Matching" in NPL 2). If, as a result of the search, the OpenFlow switch finds an entry that matches the received packet, the OpenFlow switch updates the flow statistical information (Counters) and processes the received packet on the basis of a processing content(s) (packet transmission from a specified port, flooding, dropping, etc.) written in the Instructions field of the entry. If, as a result of the search, the OpenFlow switch does not find an entry that matches the received packet, the OpenFlow switch transmits an entry setting request to the OpenFlow controller via the secure channel. Namely, the OpenFlow switch requests the OpenFlow controller to transmit control information for processing the received packet (Packet-In message). The OpenFlow switch receives a flow entry that defines a processing content(s) and updates the flow table. In this way, by using an entry stored in the flow table as control information, the OpenFlow switch performs packet forwarding.

In a centralized-control-type network as typified by a network using the above OpenFlow, a control apparatus that controls switches in a centralized manner needs to recognize a topology of the links among the switches. For example, PTL 1 discloses an OpenFlow controller that includes a function of updating topology information by using information collected from an external apparatus and the Open-Flow switches by using the Link Layer Discovery Protocol (LLDP) standardized by IEEE802.1ab.

PATENT LITERATURE (PTL)

PTL 1: Japanese Patent Kokai Publication No. 2012-175394A

NON PATENT LITERATURE (NPL)

NPL 1: Nick McKeown, and seven others, "OpenFlow: Enabling Innovation in Campus Networks," [online], [searched on Nov. 24, 2012], Internet <URL:http://www.openflow.org/documents/openflow-wp-latest.pdf>

NPL 2: "OpenFlow Switch Specification" Version 1.3.1 (Wire Protocol 0x04), [online], [searched on Dec. 11, 2012], Internet <URL: https://www.opennetworking.org/images/stories/downloads/specification/openflow-spec-v1.3.1.pdf>

SUMMARY

The disclosure of each of the above PTL and NPLs is incorporated herein by reference thereto.

The following analysis has been given by the present inventor. In a centralized-control-type network, if the link layer discovery protocol is used for recognition of a topology as disclosed in PTL 1, the switches and the control apparatus cannot distinguish LLDP packets for detecting a topology of the centralized-control-type network from LLDP packets flowing into the network as user traffic. This is counted as a problem. For example, some of the switches are connected to another network configured by layer-2 nodes, and there are cases where these switches forward LLDP packets received from another network to the data plane. Since these LLDP packets are not distinguishable from the topology-detection LLDP packets collected by the controller, a topology establishment operation performed by the controller is affected.

It is an object of the present invention to provide a communication system, a control apparatus, and a network topology management method with which a topology of an intended network can be recognized even in a network configuration in which link layer discovery protocol packets of different networks exist as described above.

Solution to Problem

According to a first aspect, there is provided a communication system including: a control apparatus configured to set control information, which causes each control target switch to distinguish a link layer discovery protocol packet of a first network from a link layer discovery protocol packet of a second network different from the first network and to perform corresponding predetermined processing, in each control target switch; a group of switches each of which is configured to transmit a link layer discovery protocol packet of the first network to a predetermined topology management apparatus in accordance with control information set by the control apparatus; and a topology management apparatus configured to manage a network topology configured by the group of switches on the basis of information included in a link layer discovery protocol packet of the first network received from each of the switches.

According to a second aspect, there is provided a control apparatus including: a control information setting unit configured to set control information, which causes each switch in a group of control target switches to distinguish a link layer discovery protocol packet of a first network from a link layer discovery protocol packet of a second network different from the first network and to perform corresponding predetermined processing, in each control target switch; wherein the control apparatus causes the group of switches to transmit a link layer discovery protocol packet of the first network to a predetermined topology management apparatus; and wherein the control apparatus causes the predetermined topology management apparatus to manage a network topology configured by the group of switches on the basis of information included in a link layer discovery protocol packet of the first network received from each of the switches.

According to a third aspect, there is provided a network topology management method including: setting control information, which causes each switch in a group of control target switches to distinguish a link layer discovery protocol packet of a first network from a link layer discovery protocol packet of a second network different from the first network and to perform corresponding predetermined processing, in each control target switch; causing the switches to transmit a link layer discovery protocol packet of the first network to a predetermined topology management apparatus in accordance with control information set by a control apparatus; and managing a network topology configured by the group of switches on the basis of information included in a link layer discovery protocol packet of the first network received from each of the switches. This method is associated with a certain machine, namely, with an apparatus that realizes a function of recognizing a topology of a centralized-control-type network.

The meritorious effects of the present invention are summarized as follows. According to the present invention, a topology of an intended network can be recognized even in a network configuration in which link layer discovery protocol packets of different networks exist.

BRIEF DESCRIPTION OF THE DRAWINGS

FIG. 4 illustrates flow entries set in a switch by a control apparatus in the communication system according to the first exemplary embodiment of the present disclosure.

PREFERRED MODES

Figure 1:
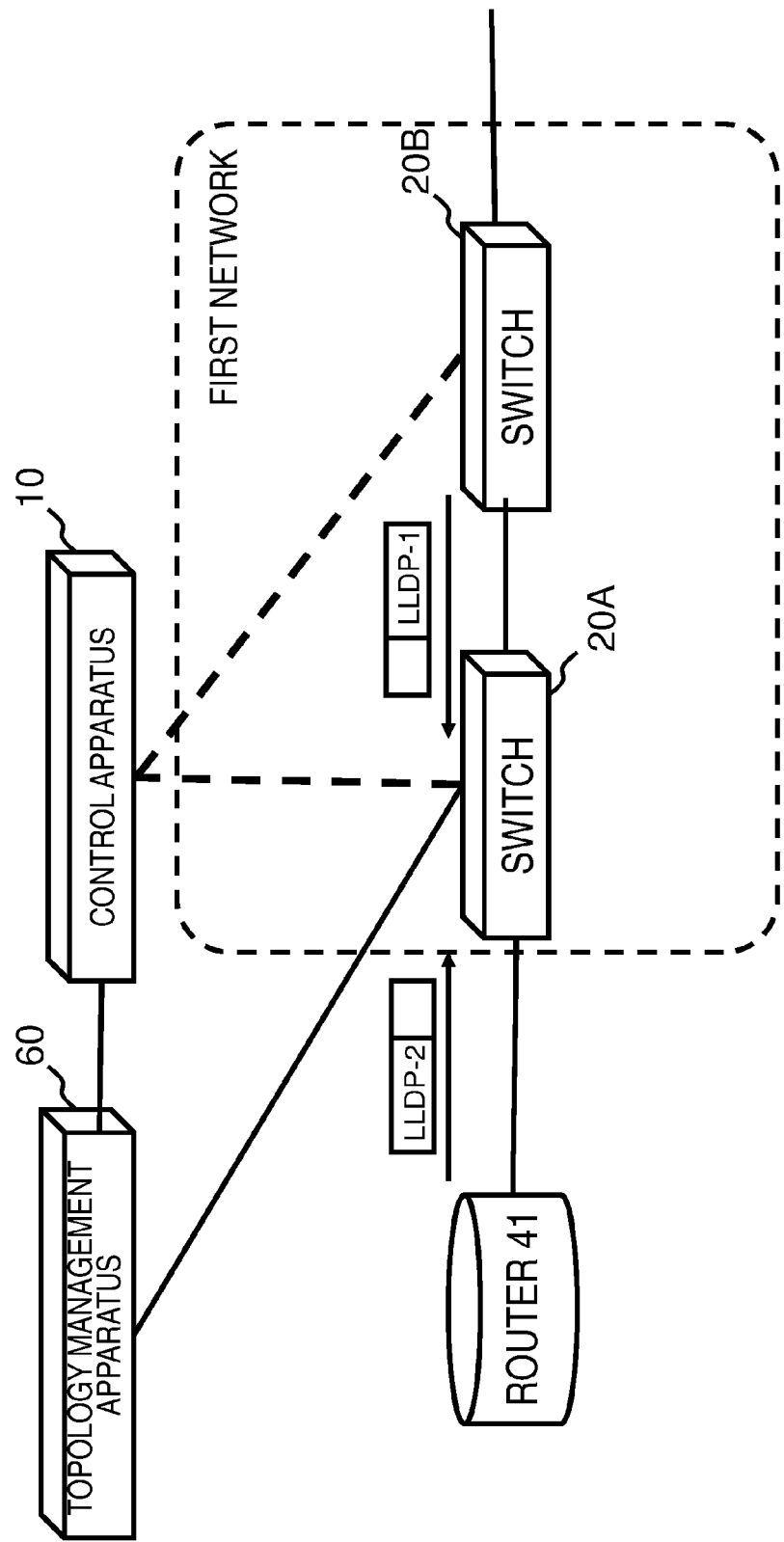
FIG. 1 illustrates a configuration according to an exemplary embodiment of the present disclosure.

First, an outline of an exemplary embodiment of the present disclosure will be described with reference to a drawing. In the following outline, various components are denoted by reference characters for the sake of convenience. Namely, the following reference characters are merely used as examples to facilitate understanding of the present disclosure, not to limit the present disclosure to the illustrated modes.

As illustrated in FIG. 1, an exemplary embodiment of the present disclosure can be realized by a configuration including: a control apparatus 10; switches 20A and 20B that operate in accordance with control information set by the control apparatus 10; and a topology management apparatus 60 that manages a network topology configured by the switches 20A and 20B.

More specifically, the control apparatus 10 sets control information, which causes each control target switch (for example, the switch 20A) to distinguish a link layer discovery protocol packet (LLDP-1) of a first network from a link layer discovery protocol packet (LLDP-2) of a second network different from the first network and to perform corresponding predetermined processing, in each control target switch. In accordance with predetermined processing that can be defined in the control information, the switch 20A transmits a link layer discovery protocol packet of the first network to the topology management apparatus 60.

For example, by detecting that the switch 20A has received a link layer discovery protocol packet (LLDP-1) of the first network transmitted from the switch 20B, the topology management apparatus 60 detects a link between the switches 20A and 20B. When the switch 20A receives a link layer discovery protocol packet (LLDP-2) of the second network, the switch 20A may notify the control apparatus 10 of reception of the packet (response instruction request) or perform transmission of a packet (an LLDP packet, for example) previously instructed by the control apparatus 10, for example.

The transmission of the link layer discovery protocol packet (LLDP-1) of the first network from the switch 20B to the switch 20A may be instructed by the control apparatus 10 or the topology management apparatus 60.

With such configuration as described above, a topology of an intended network can be recognized even in a network configuration in which link layer discovery protocol packets of different networks exist.

First Exemplary Embodiment

Figure 2:
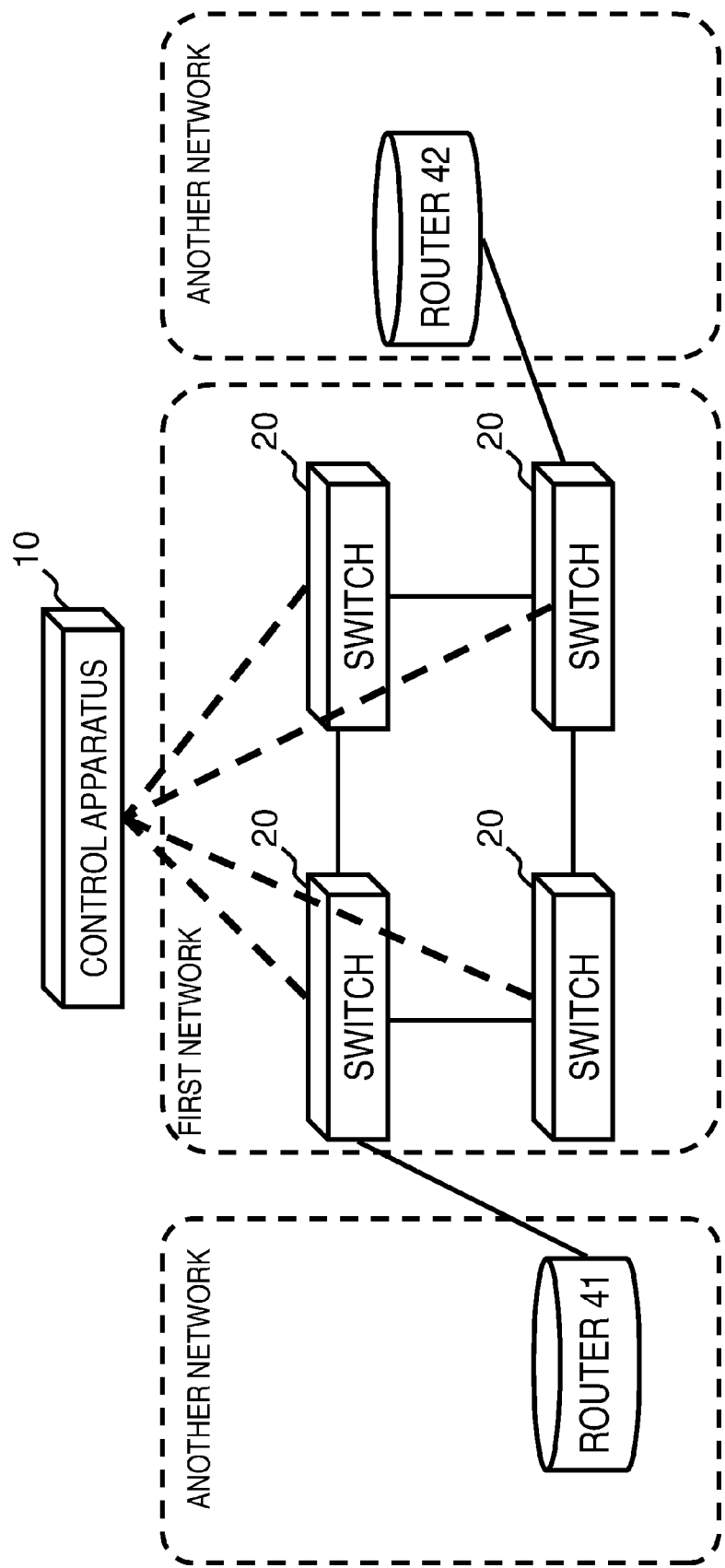
FIG. 2 illustrates a configuration of a communication system according to a first exemplary embodiment of the present disclosure.

Next, a first exemplary embodiment of the present disclosure will be described in detail with reference to the drawings. FIG. 2 illustrates a configuration of a communication system according to the first exemplary embodiment of the present disclosure. FIG. 2 illustrates a configuration which includes: a plurality of switches 20 each of which is connected to other switches 20 to configure a first network; and a control apparatus 10 that controls the switches 20 by setting flow entries in the switches 20. In addition, among the switches 20, two switches that border with two other networks are also connected to routers 41 and 42, respectively.

The control apparatus 10 sets flow entries in the switches 20 via dedicated channels indicated by dashed lines in FIG. 2, respectively. In addition, the control apparatus 10 instructs each of the switches 20 to transmit an LLDP packet to detect a topology of the first network. An apparatus that includes functions equivalent to those of the OpenFlow controller in NPLs 1 and 2 can be used as the control apparatus 10. A Flow_mod message in NPL 2 can be used for setting a flow entry. Likewise, a Packet_Out message can be used as the instruction for transmitting an LLDP packet. In addition, the control apparatus 10 according to the present exemplary embodiment also operates as the above topology management apparatus.

Each switch 20 includes a lookup table referred to as a flow table including flow entries set by the control apparatus 10. When a switch 20 receives a packet from another node, the switch 20 searches its flow table for a flow entry having a match condition(s) that matches the received packet. If the switch 20 finds a matching flow entry, the switch performs the processing content(s) defined in the flow entry (forwarding from a specified port, header rewriting, etc.). If, as a result of the search, the switch 20 does not find a flow entry having a match condition(s) that matches the received packet, the switch 20 transmits, as a flow entry setting request, the received packet or information extracted from the received packet to the control apparatus 10. An apparatus that includes functions equivalent to those of an OpenFlow switch in NPLs 1 and 2 can be used as the switch 20. A Packet_In message in NPL 2 can be used as the flow entry setting request.

The routers 41 and 42 are apparatuses that belong to networks such as a layer 2/layer 3 network and transmit LLDP packets at defined timing.

Next, the difference between an LLDP packet that is transmitted by the router 41/42 and standardized by IEEE802.1ab and an LLDP packet that is transmitted by a switch 20 in response to an instruction from the control apparatus 10 will be described.

Figure 3:
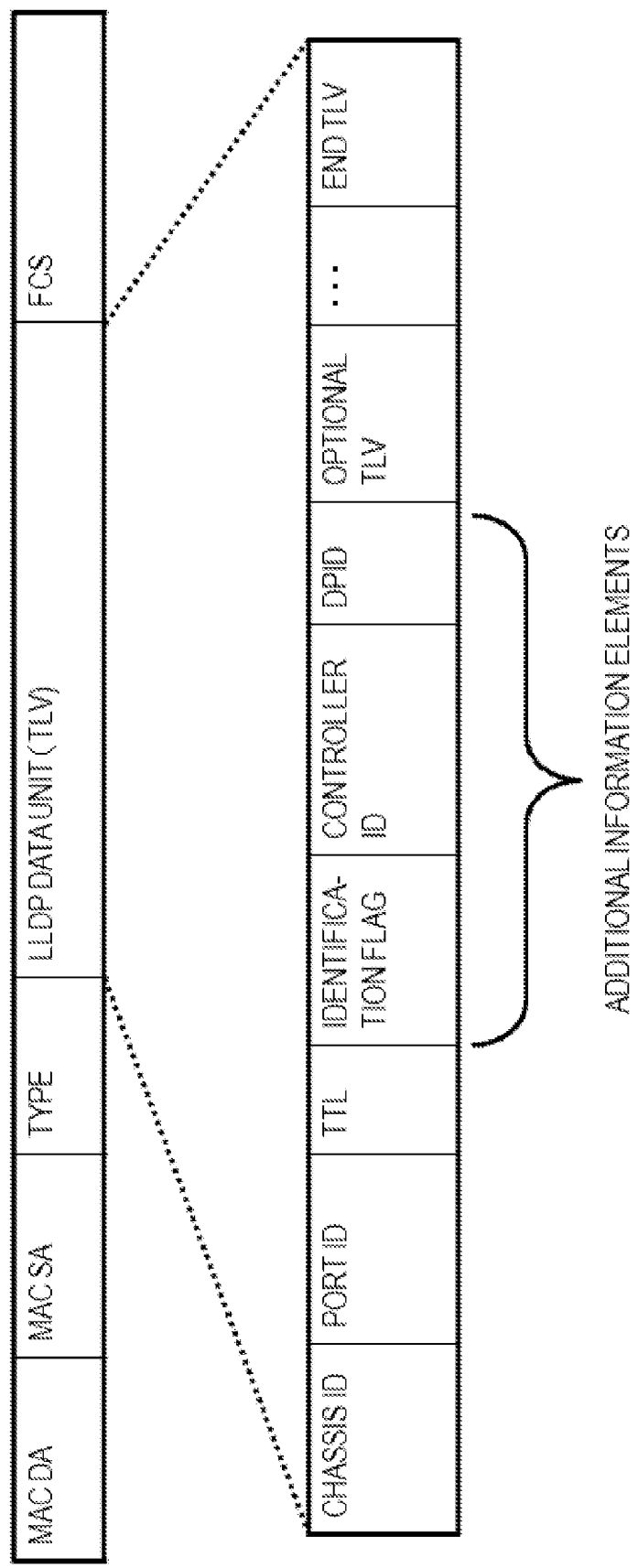
FIG. 3 illustrates a configuration of a link layer discovery protocol packet used in the communication system according to the first exemplary embodiment of the present disclosure.

FIG. 3 illustrates a configuration of a link layer discovery protocol packet used in the communication system according to the first exemplary embodiment of the present disclosure (an LLDP packet transmitted by a switch 20 in response to an instruction from the control apparatus 10). This packet in FIG. 3 differs from an LLDP packet standardized by IEEE802.1ab in that "Identification flag," "Controller ID," and "DPID" are added as additional information elements in addition to "Chassis ID," "Port ID," and "Time To Live (TTL)," which are necessary information elements (TLVs) in the LLDP data unit. Such addition of information elements are permitted as options by IEEE802.1ab.

"Identification flag" indicates whether the corresponding LLDP transmitting port and switch are control targets of the control apparatus 10. This information element "Identification flag" is used so that the switches 20 can distinguish the LLDP packets, which have been transmitted by the switches 20 in response to an instruction from the control apparatus 10, from general LLDP packets.

In the information element "Controller ID," an ID of the control apparatus 10 that has transmitted an instruction for transmitting an LLDP packet is stored. In a centralized-control-type network, there are cases where a plurality of control apparatuses are arranged to operate in coordination with each other. In such cases, "Controller ID" is used for identifying the control apparatus that has transmitted an instruction for transmitting an LLDP packet. A name, the IP (Internet Protocol) address, or the MAC (Media Access Control) address of the control apparatus can be used as the "Controller ID."

The information element "DPID" in an LLDP packet indicates a data path ID that is set in a port of a switch 20 that transmits the LLDP packet. There are networks in which a single physical switch has a plurality of logical switches (virtual switches). By using the information element "DPID," it is possible to recognize a topology of a logically-divided network (a virtual network) including not only physical switches but also virtual switches.

Next, a mechanism in which a switch 20 distinguishes the difference between the above LLDP packets will be described. FIG. 4 illustrates flow entries registered in a flow table of a switch 20. As illustrated in FIG. 4, the following three fields are associated with each other in each flow entry: match conditions defining contents against which a received packet is matched; a flow statistical information field storing, for example, the number of packets that have matched the match condition(s); and instructions defining a processing content(s) to be applied to the packets matching the match condition(s). In FIG. 4, higher priority flow entries are stored higher on the list in the flow table.

For example, the flow table in FIG. 4 includes a user-traffic flow entry at the top. This flow entry is for forwarding packets transmitted from a user connected to the switch 20. Examples of the user-traffic flow entry include a flow entry for forwarding general LLDP packets transmitted from the router 41 or 42. In addition, the flow table in FIG. 4 includes, as a lower entry, a flow entry for processing topology-detection packets of the first network. This flow entry defines a processing content performed on LLDP packets including the above additional information elements. For example, information representing that Ethernet (registered mark) Type (88CC) indicating LLDP is set and that the identification flag is "1 (=control target)" is set as match conditions. In addition, in the example in FIG. 4, "forwarding to the control apparatus 10" is set as the processing content to be applied to the packets matching the above match conditions. Since the necessary items stored as the match conditions in NPL 2 does not include the identification flag as an additional information element of the LLDP, the identification flag needs to be set as an item that is arbitrarily extendable by a vendor.

By setting such two or more flow entries having the above priority levels, the switch 20 can be caused to forward user traffic (including an LLDP packet transmitted from the router 41 or 42) that matches the user-traffic flow entry to a corresponding forwarding destination and to forward an LLDP packet (an LLDP packet including the additional information elements) transmitted by a switch 20 in response to an instruction from the control apparatus 10 to the control apparatus 10.

Figure 5:
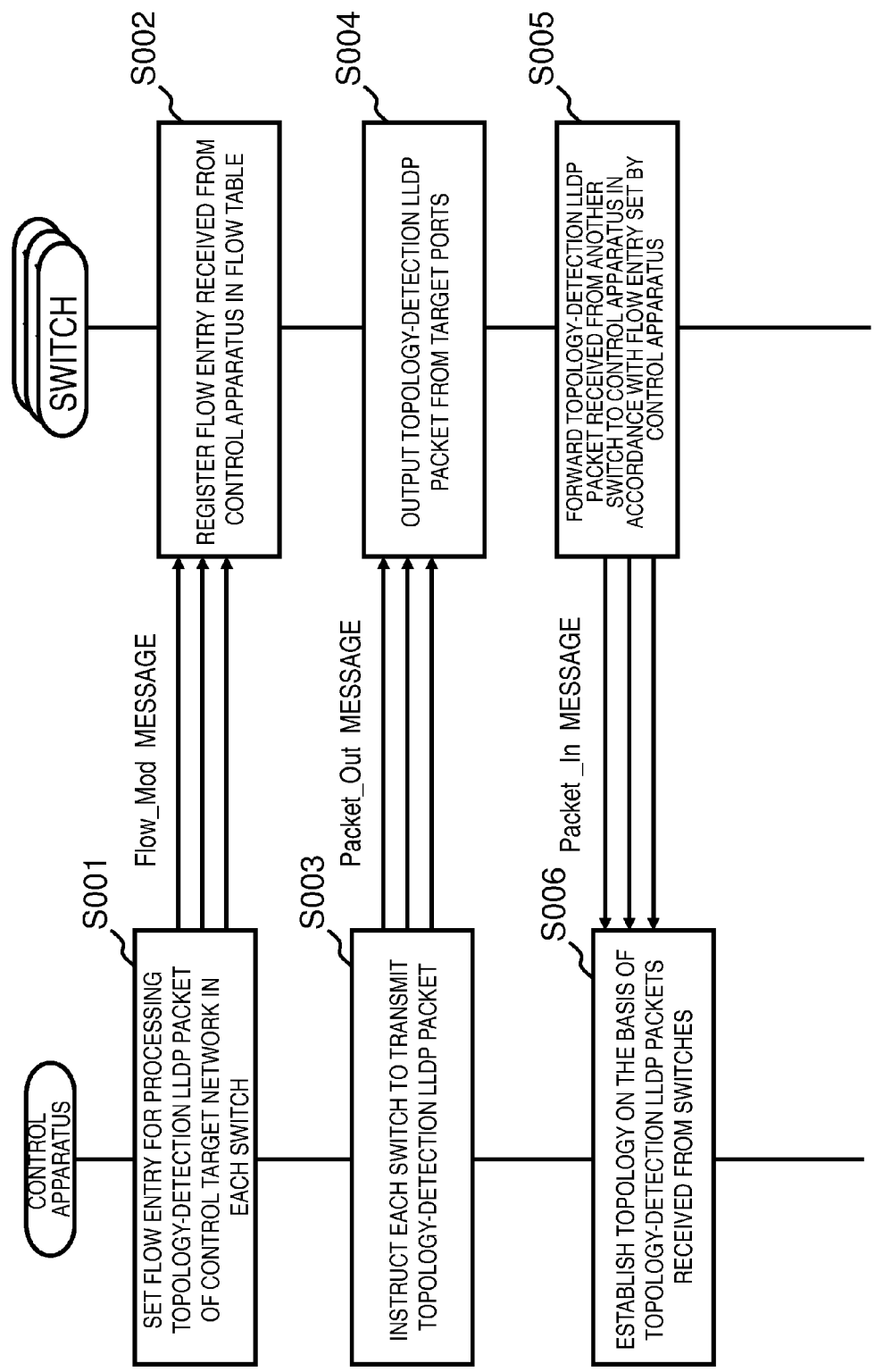
FIG. 5 illustrates operations of the communication system according to the first exemplary embodiment of the present disclosure.

Next, an operation according to the present exemplary embodiment will be described in detail with reference to the drawings. FIG. 5 illustrates operations of the communication system according to the first exemplary embodiment of the present disclosure. As illustrated in FIG. 5, first, the control apparatus 10 creates and sets flow entries in FIG. 4 in each switch 20 (step S001 in FIG. 5).

When receiving the flow entry setting instruction, each switch 20 registers the flow entries transmitted from the control apparatus 10 in its own flow table (step S002 in FIG. 5).

Figure 6:
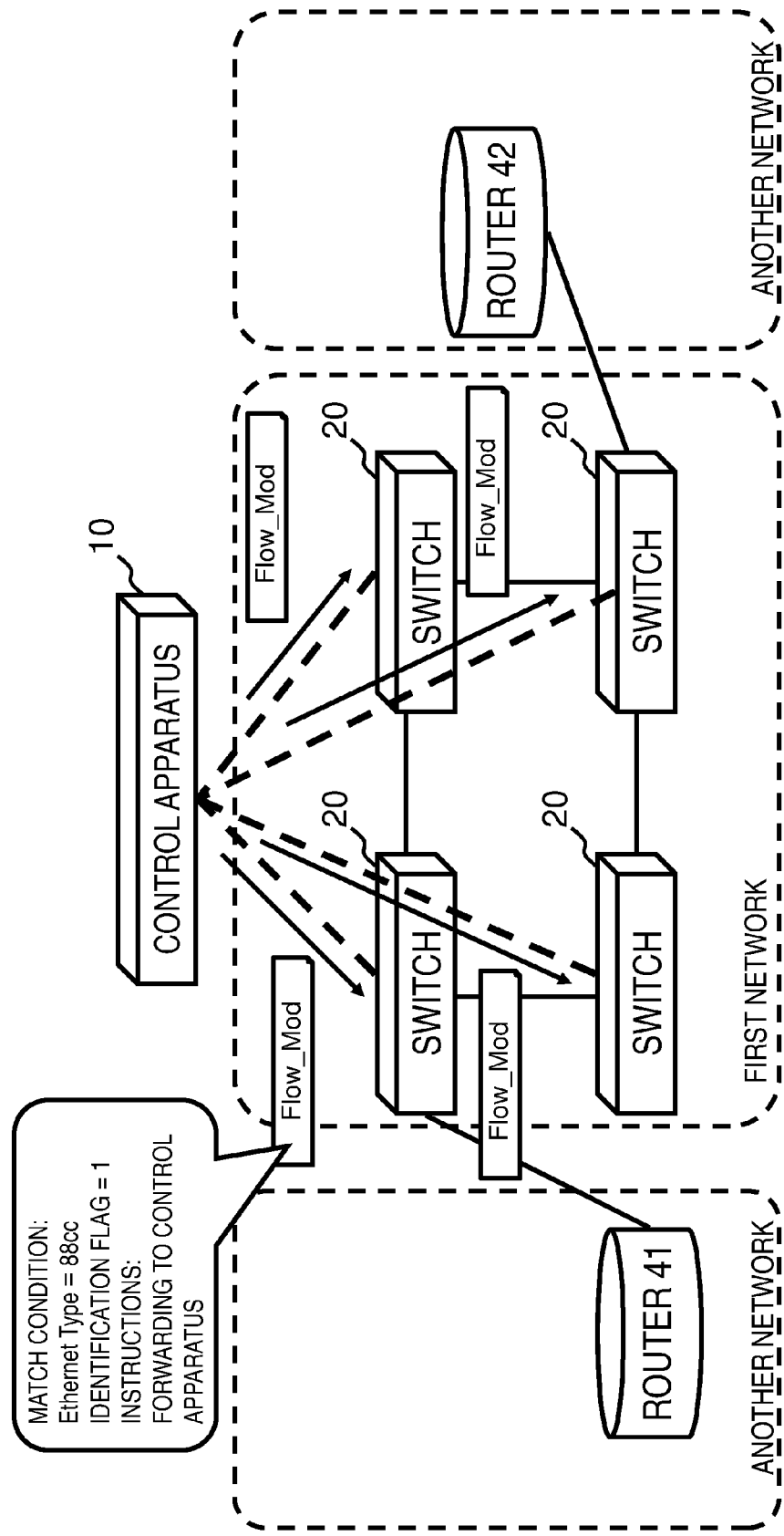
FIG. 6 illustrates the operations in steps S001 and S002 in FIG. 5.

FIG. 6 illustrates the operations in steps S001 and S002 in FIG. 5. As illustrated in FIG. 6, the control apparatus 10 uses a Flow_mod message to set, in each control target switch 20, a flow entry for forwarding LLDP packets including "1" as the identification flag to the control apparatus 10.

Next, the control apparatus 10 transmits a first network topology detection packet to each switch 20 and instructs each switch 20 to transmit a topology detection packet from the ports other than the reception port (step S003 in FIG. 5). In accordance with the instruction, each switch 20 transmits the first network topology-detection packet received from the control apparatus 10 from the ports other than the reception port (step S004 in FIG. 5).

Figure 7:
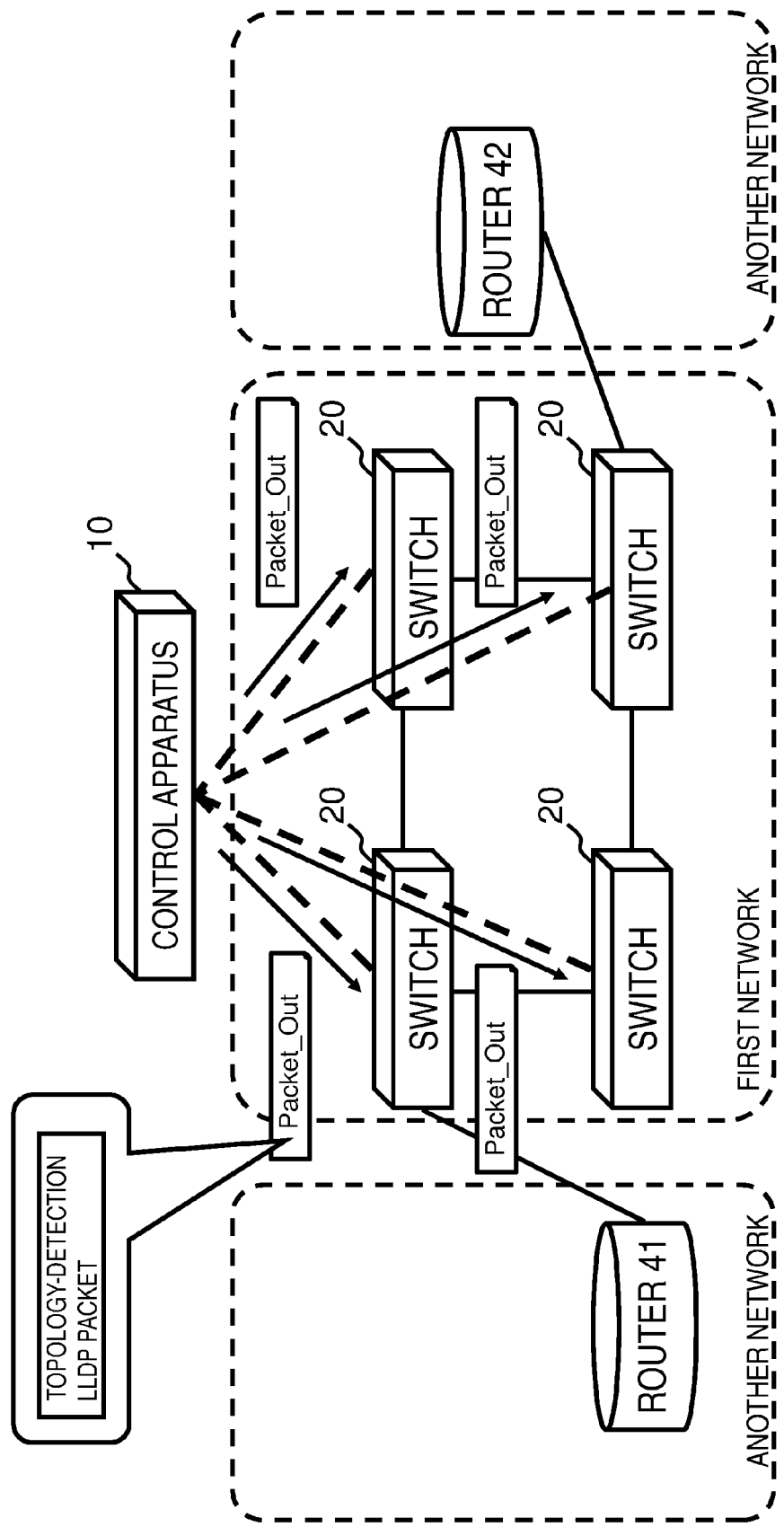
FIG. 7 illustrates the operation in step S003 in FIG. 5.

FIG. 7 illustrates the operation in step S003 in FIG. 5. As illustrated in FIG. 7, the control apparatus 10 uses a Packet_Out message to transmit to an LLDP packet (topology-detection LLDP packet) including the above additional information elements to each control target switch 20, so as to cause each control target switch 20 to transmit the LLDP packet (topology-detection LLDP packet) including the above additional information elements from the ports other than the reception port.

Figure 8:
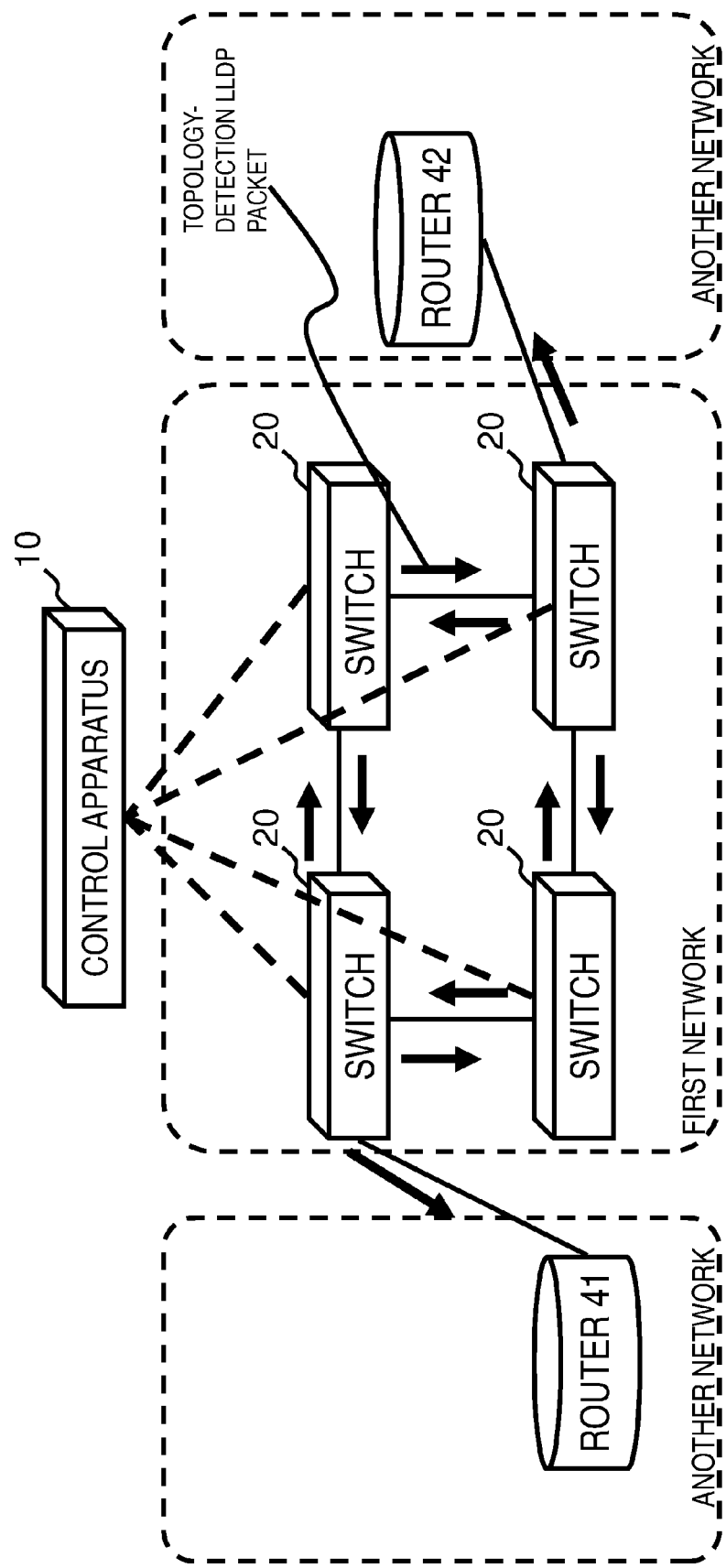
FIG. 8 illustrates the operation in step S004 in FIG. 5.

FIG. 8 illustrates the operation in step S004 in FIG. 5. When receiving the instruction, each switch 20 transmits the LLDP packet (topology-detection LLDP packet) including the above additional information elements from each of the target ports.

When a switch 20 receives an LLDP packet (topology-detection LLDP packet) including these additional information elements, the switch 20 transmits the LLDP packet (topology-detection LLDP packet) including the additional information elements to the control apparatus 10 in accordance with the flow entry set in steps S001 and S002 (S005 in FIG. 5).

When receiving the LLDP packets (topology-detection LLDP packets) each including the additional information elements, the control apparatus 10 refers to the controller IDs and DPIDs included in these additional information elements, determines a connection relationship among the switches 20, and establishes a topology (S006 in FIG. 5). For example, if an LLDP packet (topology-detection LLDP packet) includes a controller ID different from that of the control apparatus 10, such LLDP packet is dropped. This is because such LLDP packet is an LLDP packet transmitted from a control apparatus 10 of another centralized-control-type network.

Figure 9:
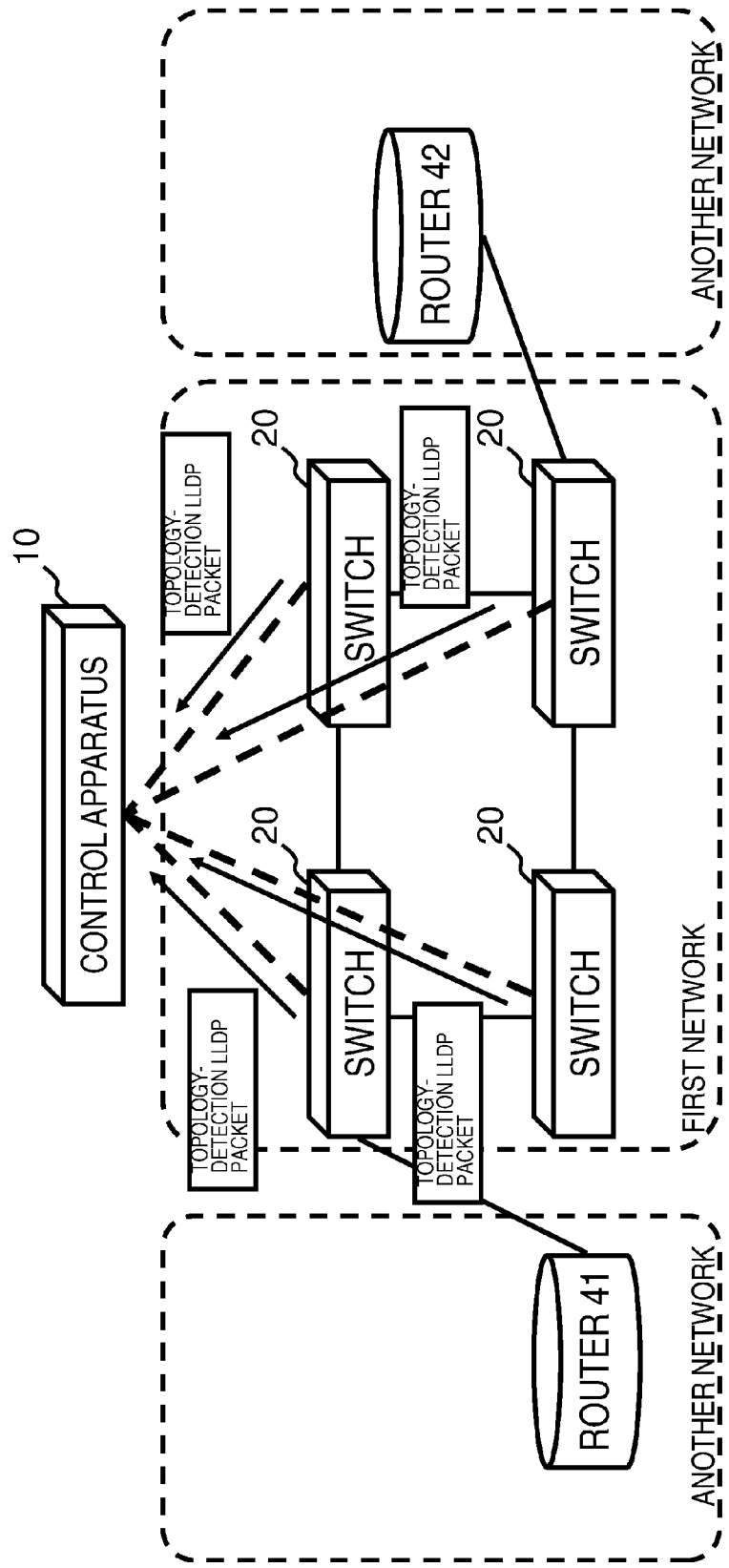
FIG. 9 illustrates the operations in steps S005 and S006 in FIG. 5.

FIG. 9 illustrates the operations in steps S005 and S006 in FIG. 5. When receiving an LLDP packet (topology-detection LLDP packet) including the additional information elements from another switch 20, each switch 20 transmits the LLDP packet (topology-detection LLDP packet) received from another switch 20 to the control apparatus 10.

Next, a basic operation of a switch 20 will be described, the operation including a case in which the switch 20 receives an LLDP packet (topology-detection LLDP packet) that does not include the additional information elements.

Figure 10:
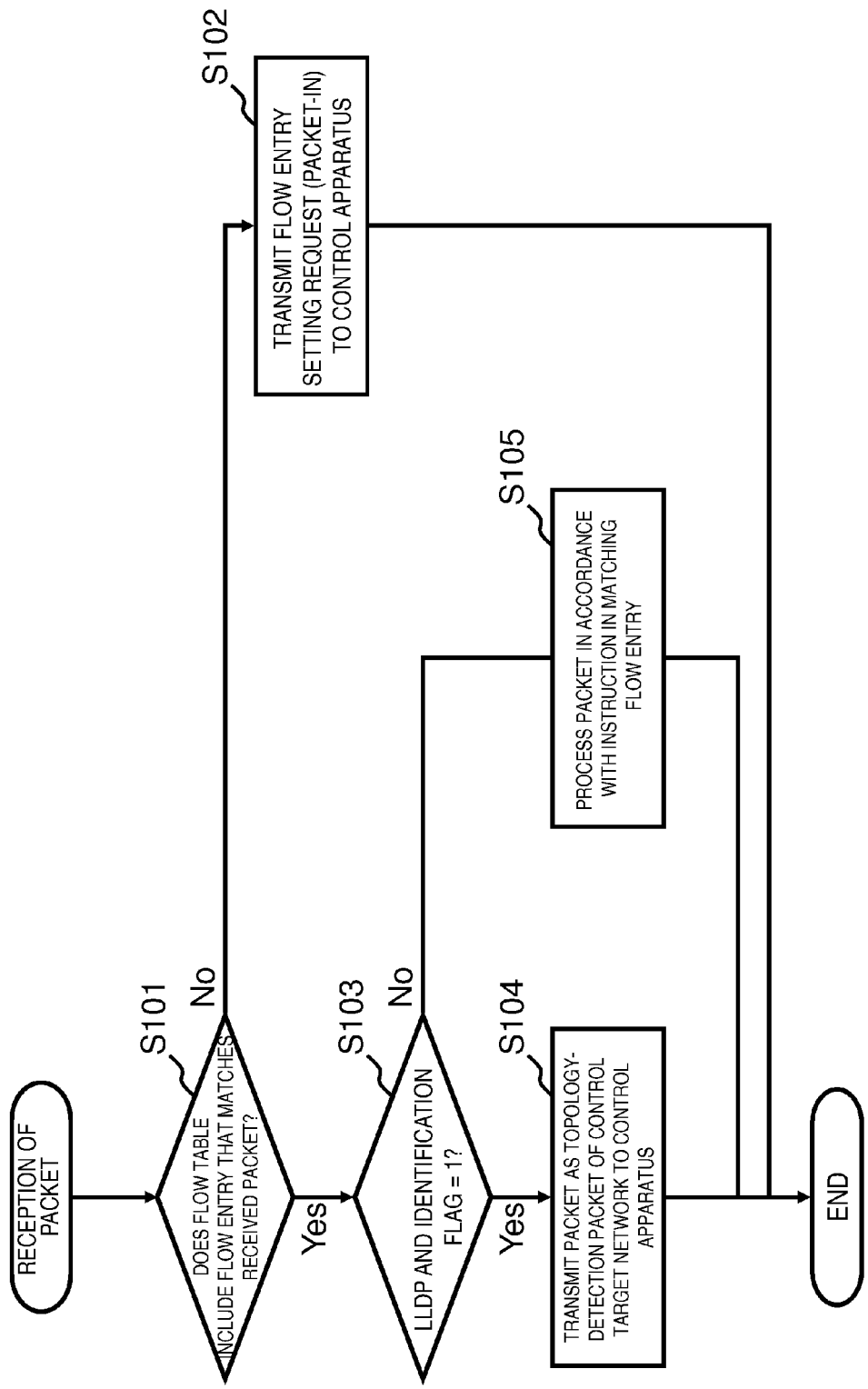
FIG. 10 illustrates operations of a switch according to the first exemplary embodiment of the present disclosure.
Figure 11:
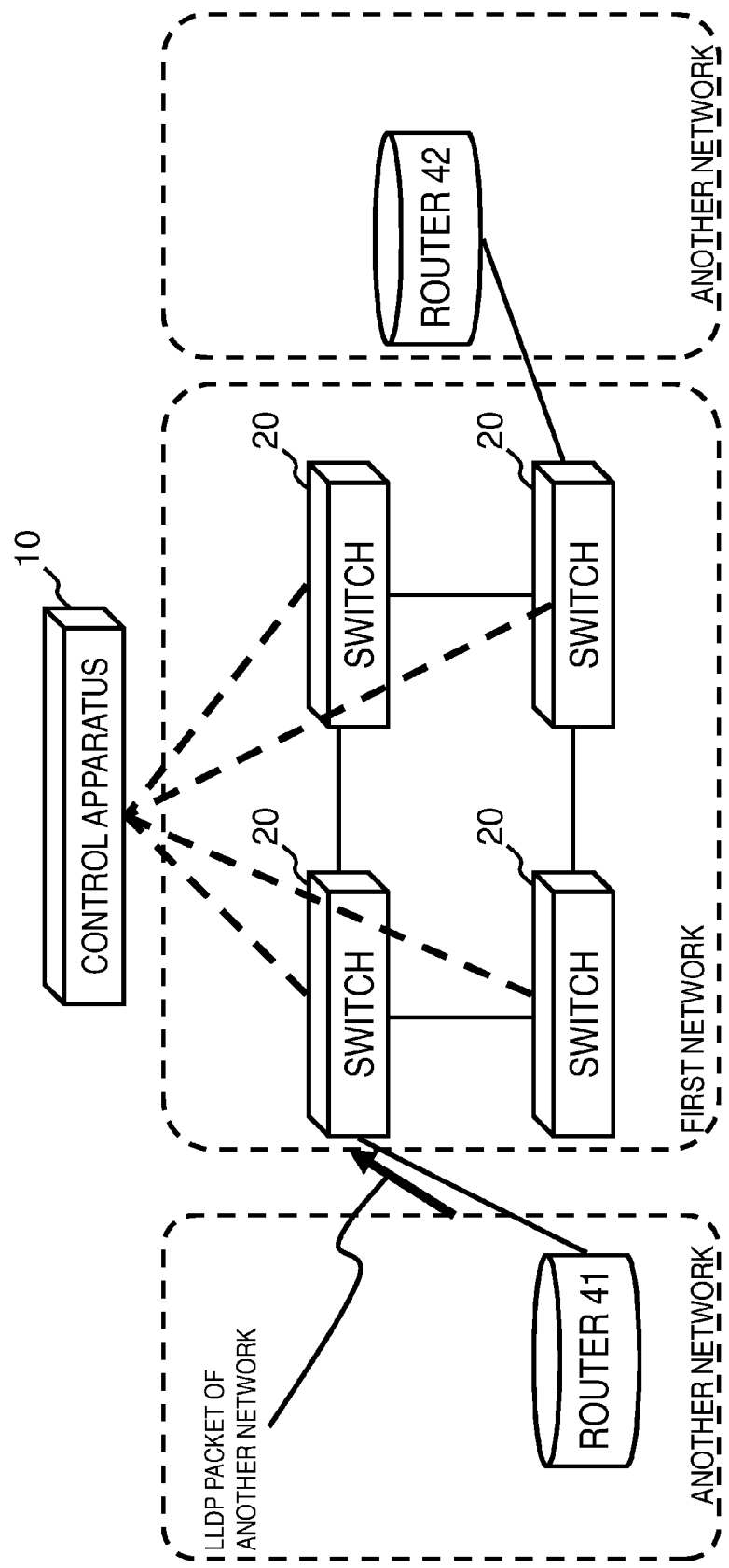
FIG. 11 illustrates the operation in step S101 in FIG. 10.
Figure 12:
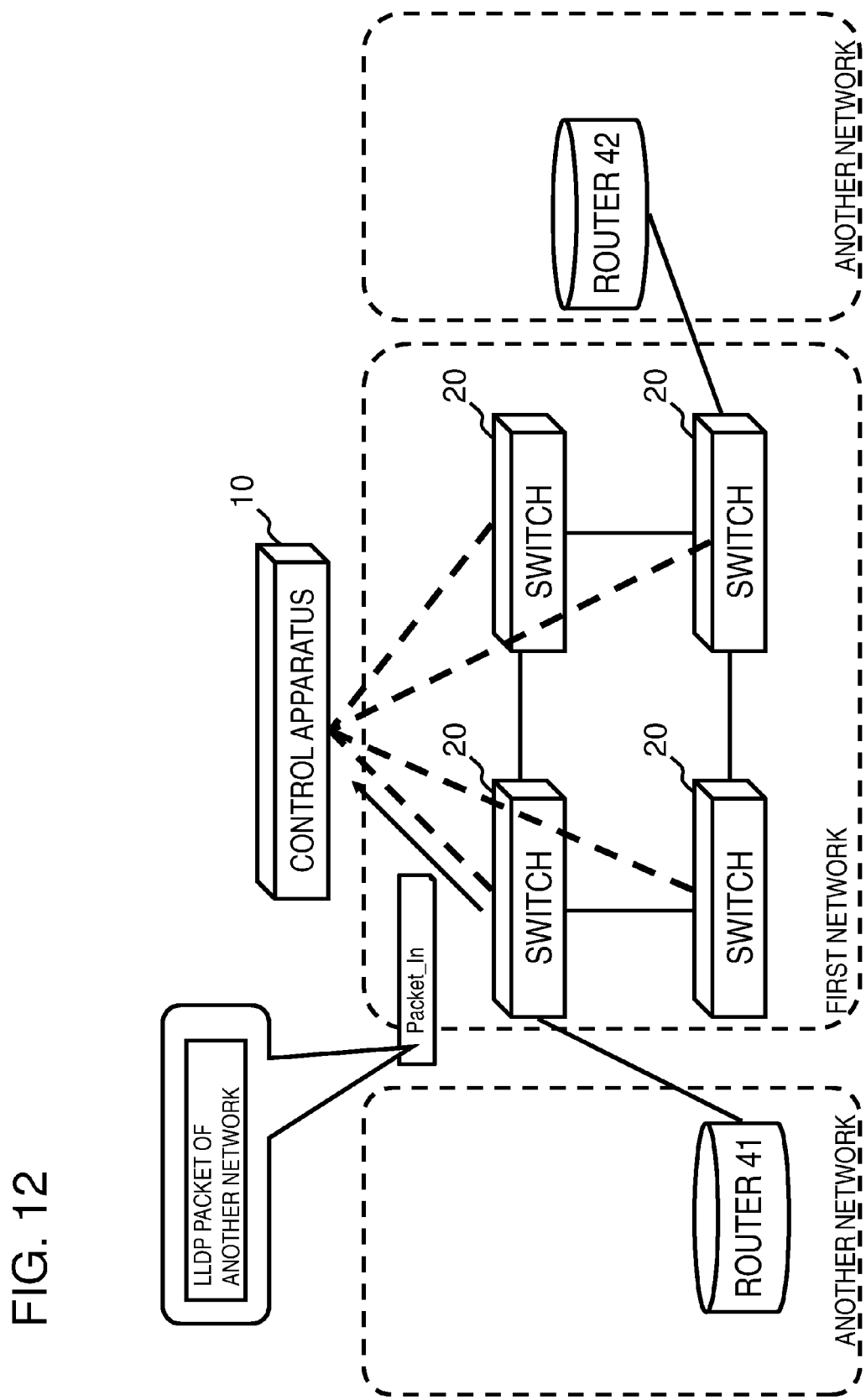
FIG. 12 illustrates the operation in step S102 in FIG. 10.

FIG. 10 illustrates operations of a switch according to the first exemplary embodiment of the present disclosure. As illustrated in FIG. 10, when a switch 20 receives a packet, the switch 20 searches its own flow table for a flow entry having a match condition(s) that matches the received packet (step S101 in FIG. 10). As a result of the search, if the switch 20 does not find a flow entry having a match condition(s) that matches the received packet (No in step S101), the switch 20 transmits the received packet or information extracted from the received packet to the control apparatus 10 as a flow entry setting request (step S102 in FIG. 10). For example, when the switch 20 receives an LLDP packet of another network from the router 41 as illustrated in FIG. 11, the switch 20 transmits a Packet_In message as a flow entry setting request to the control apparatus 10 as illustrated in FIG. 12.

Figure 13:
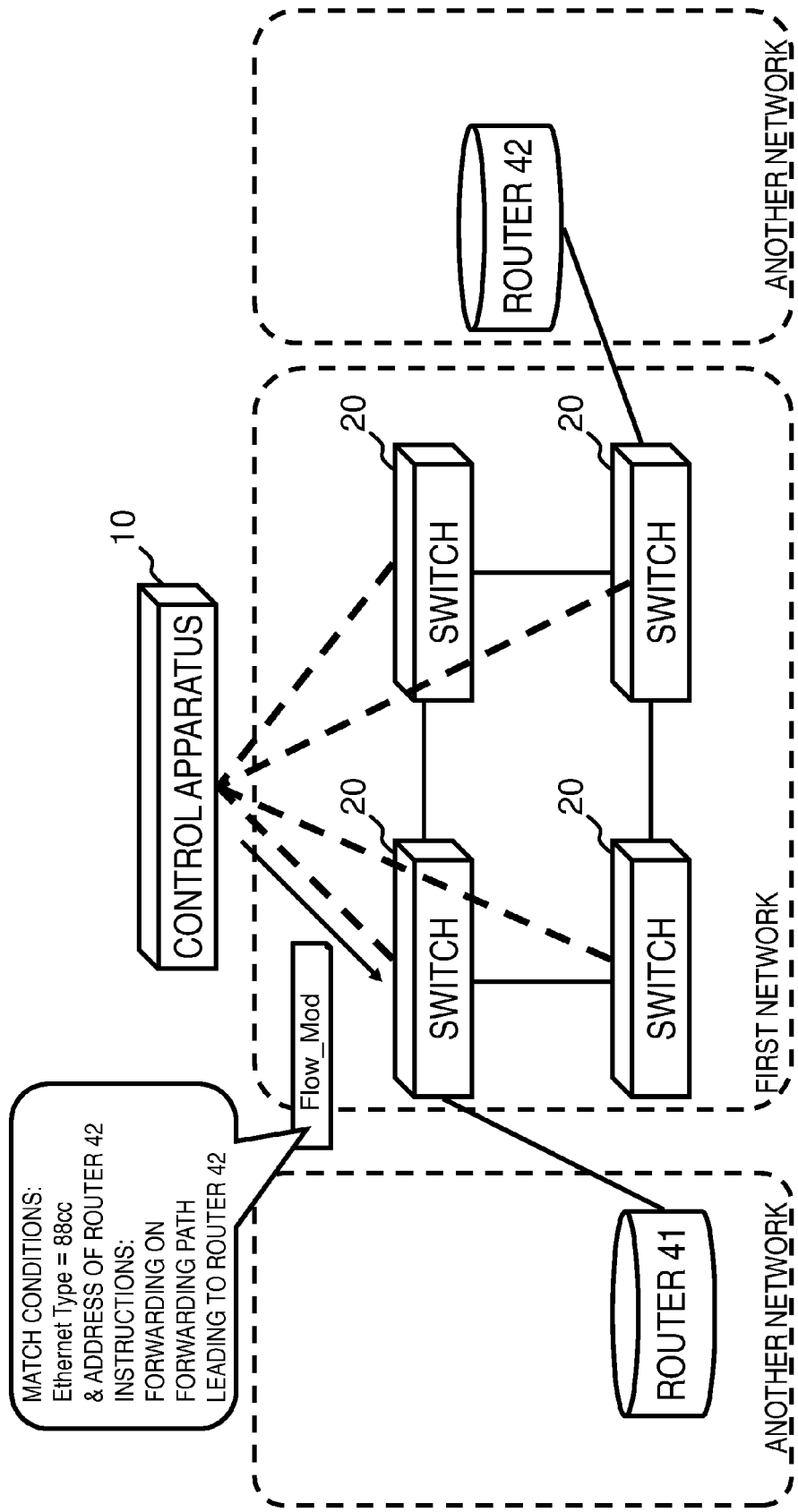
FIG. 13 illustrates the operation performed after step S102 in FIG. 10.

When receiving the flow entry setting request, the control apparatus 10 sets a flow entry for the switch 20. For example, as illustrated in FIG. 13, the control apparatus 10 may set a flow entry for forwarding the LLDP packet of another network from the router 41 to the router 42 via the switch 20.

Figure 14:
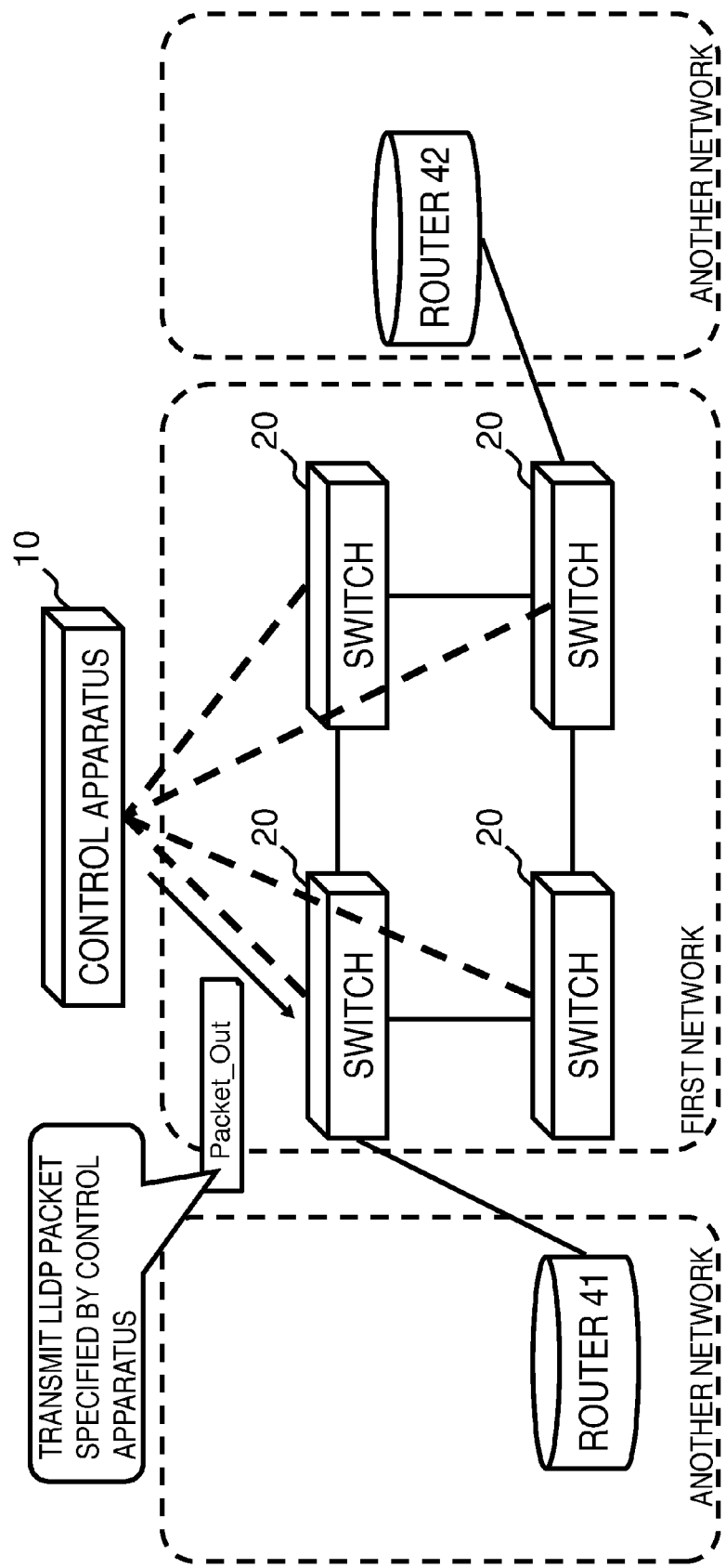
FIG. 14 illustrates another operation performed after step S102 in FIG. 10.

For example, when receiving the flow entry setting request, the control apparatus 10 may instruct the switch 20 to transmit an LLDP packet to the router 41, as illustrated in FIG. 14. In this way, the router 41 views the entire first network as a single switch.

In contrast, if, in step S101 in FIG. 10, the switch 20 finds a flow entry having a match condition(s) that matches the received packet (Yes in step S101) and if the flow entry is a flow entry for processing a topology-detection packet illustrated in FIG. 4 (Yes in step S103), the switch 20 transmits the received packet (the LLDP packet transmitted in response to an instruction from the control apparatus 10) to the control apparatus 10, in accordance with the flow entry for processing a topology-detection packet illustrated in FIG. 4 (step S104). This corresponds to the operation described with reference to FIG. 9.

In addition, in step S103, if the switch 20 determines that the flow entry is not the flow entry for processing a topology-detection packet illustrated in FIG. 4 (No in step S103), namely, if the received packet matches the user-traffic flow entry, the switch 20 processes the packet in accordance with the instruction defined in the matching flow entry. For example, as the operation in step S105 in FIG. 10, if the control apparatus 10 has already set a flow entry for forwarding an LLDP packet of another network to the router 42 or the like, the LLDP packet of another network is transmitted to the router 42 in accordance with the flow entry.

As described above, according to the present exemplary embodiment, each switch 20 can distinguish the topology-detection LLDP packets of its own network (first network) transmitted from the control apparatus 10 to each switch 20 from the LLDP packets flowing as user traffic and can forward the packets to the control apparatus 10.

Second Exemplary Embodiment

In the above first exemplary embodiment, an identification flag stored as an additional information element of an LLDP packet is used as a match condition in a flow entry set in a switch 20. In addition, on the basis of the identification flag, each switch 20 identifies a topology-detection LLDP packet of its own network (first network) transmitted from the control apparatus 10 to a switch. Next, a second exemplary embodiment of the present disclosure will be described. The second exemplary embodiment achieves equivalent advantageous effects without using the above identification flag as a match condition of a flow entry set in a switch 20. Since only the flow entries set by the control apparatus 10 in each switch 20 are different between the first and second exemplary embodiments of the present disclosure, the following description will be made with a focus on the difference.

Figure 15:
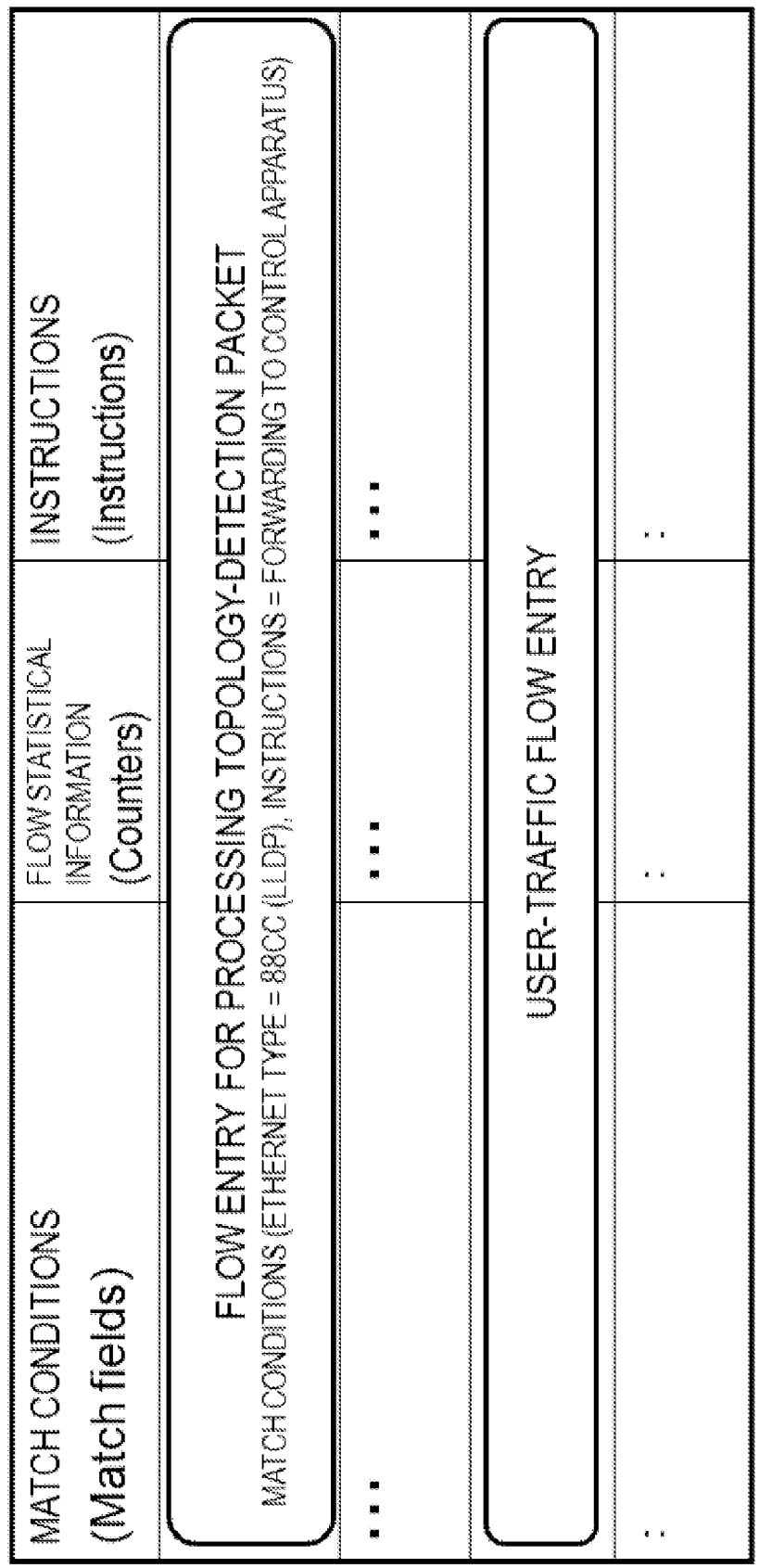
FIG. 15 illustrates flow entries set in a switch by a control apparatus in a communication system according to a second exemplary embodiment of the present disclosure.

FIG. 15 illustrates flow entries set in a switch by a control apparatus in a communication system according to a second exemplary embodiment of the present disclosure. Unlike the flow entries in FIG. 4, the flow entry for forwarding a topology-detection LLDP packet to the control apparatus 10 is listed at the top in the flow table in FIG. 15 and therebelow the flow entry for processing individual user traffic is listed.

Even when the above flow entries are set, topology-detection LLDP packets, including LLDP packets transmitted from the router 41 or 42, are forwarded to the control apparatus 10. However, as described with reference to FIG. 3, an LLDP packet transmitted from a switch 20 in response to an instruction from the control apparatus 10 includes the additional information elements (TLVs), the control apparatus 10 can distinguish the LLDP packets from the LLDP packets transmitted from the router 41 or 42.

Thus, according to the present exemplary embodiment, the control apparatus 10, which also operates as a topology management apparatus, can also recognize the network topology configured by the switches 20. In addition, since the control apparatus 10 can distinguish the LLDP packets from the LLDP packets transmitted from the router 41 or 42, the control apparatus 10 can instruct a switch 20 to forward a packet to a predetermined destination as illustrated in FIG. 13 or to transmit an LLDP packet as illustrated in FIG. 14.

In addition, according to the present exemplary embodiment, each switch 20 does not need to check the values of the additional information elements in an LLDP packet. Thus, compared with the first exemplary embodiment, switches that are more compatible with the specification in NPL 2 can be used, counted as an advantageous effect. In addition, the forwarding performance of each switch 20 is less affected, counted as an advantageous effect.

While exemplary embodiments of the present invention have thus been described, the present invention is not limited thereto. Further variations, substitutions, or adjustments can be made without departing from the basic technical concept of the present invention. For example, the configurations of the networks and elements illustrated in the drawings are used only as examples to facilitate understanding of the present invention. Namely, the present invention is not limited to the configurations illustrated in the drawings.

For example, while LLDP packets are used as the link layer discovery protocol packets of the first network in the above exemplary embodiments, other packets may be used.

Finally, suitable modes of the present invention will be summarized.

[Mode 1]
(See the communication system according to the above first aspect)

[Mode 2]
The communication system according to mode 1;
wherein each link layer discovery protocol packet of the first network is a packet including predetermined information elements in addition to information elements included in a link layer discovery protocol packet of the second network.

[Mode 3]
The communication system according to mode 1 or 2;
wherein the predetermined information elements include an identifier (DPID) uniquely given to a physical switch and a virtual switch; and
wherein the topology management apparatus manages the network topology in which the physical switch and virtual switch are included.

[Mode 4]
The communication system according to any one of modes 1 to 3;
wherein the predetermined information elements include information representing whether a port(s) of a corresponding one of the switches is a control target of the control apparatus; and
wherein the control apparatus causes each of the switches to distinguish a link layer discovery protocol packet of the first network on the basis of the information about the port(s).

[Mode 5]
The communication system according to any one of modes 1 to 4;
wherein the predetermined information elements include information (Controller ID) about the control apparatus that controls each of the switches; and
wherein the topology management apparatus selects a packet used for managing the network topology on the basis of the information about the control apparatus.

[Mode 6]
The communication system according to any one of modes 1 to 5;
wherein, in place of the control information for causing each of the switches to distinguish a link layer discovery protocol packet of the first network from a link layer discovery protocol packet of the second network different from the first network and to perform corresponding predetermined processing, the control apparatus sets control information, which causes each of the switches to forward a link layer discovery protocol packet to the predetermined topology management apparatus;
wherein the topology management apparatus determines whether a link layer discovery protocol packet is of the first or second network and manages the network topology configured by the group of switches.

[Mode 7]
The communication system according to any one of modes 1 to 6;
wherein the control apparatus serves as the topology management apparatus.

[Mode 8]
The communication system according to any one of modes 1 to 7;
wherein the control apparatus instructs the group of switches to transmit a link layer discovery protocol packet of the first network.

[Mode 9]
(See the control apparatus according to the above second aspect)

[Mode 10]
(See the network topology management method according to the above third aspect)

Modes 9 and 10 can be expanded in the same way as mode 1 is expanded to modes 2 to 8.

The disclosure of each of the above PTL and NPLs is incorporated herein by reference thereto. Modifications and adjustments of the exemplary embodiments and the examples are possible within the scope of the overall disclosure (including the claims) of the present invention and based on the basic technical concept of the present invention. In addition, various combinations and selections of various disclosed elements (including the elements in each of the claims, exemplary embodiments, examples, drawings, etc.) are possible within the scope of the claims of the present invention. Namely, the present invention of course includes various variations and modifications that could be made by those skilled in the art according to the overall disclosure including the claims and the technical concept. In particular, the present description discloses numerical value ranges. However, even if the description does not particularly disclose arbitrary numerical values or small ranges included in the ranges, these values and ranges should be deemed to have been specifically disclosed.

REFERENCE SIGNS LIST 10 control apparatus
20, 20A, 20B switch
41, 42 router
60 topology management apparatus

What is claimed is:

1. A communication system, comprising:
a control apparatus configured to set an instruction, which causes each control target switch to distinguish a link layer discovery protocol packet of a first network from a link layer discovery protocol packet of a second network different from the first network and to perform a processing, in said each control target switch;
a group of switches each of which is configured to transmit a link layer discovery protocol (LLDP) packet of the first network to a predetermined topology management apparatus in accordance with the instruction set by the control apparatus; and
a topology management apparatus configured to manage a network topology configured by the group of switches on a basis of information included in the link layer discovery protocol (LLDP) packet of the first network received from said each of the switches,
wherein the link layer discovery protocol (LLDP) packet of the first network includes predetermined information elements including:
an identification flag that indicates whether a corresponding LLDP transmitting port and a switch are control targets of the control apparatus;
a controller ID including an ID of the control apparatus that transmits the instruction for transmitting the LLDP packet is stored; and
a data path ID (DPID) that is set in a port of a switch that transmits the LLDP packet.

2. The communication system according to claim 1, wherein each link layer discovery protocol packet of the first network comprises a packet including the predetermined information elements in addition to information elements included in a link layer discovery protocol packet of the second network.

3. The communication system according to claim 2, wherein the DPID in the predetermined information elements includes an identifier uniquely given to a physical switch and a virtual switch, and
wherein the topology management apparatus manages the network topology in which the physical switch and the virtual switch are included.

4. The communication system according to claim 2, wherein the control apparatus causes said each of the switches to distinguish the link layer discovery protocol packet of the first network on a basis of information about the corresponding LLDP transmitting port.

5. The communication system according to claim 2, wherein the controller ID of the predetermined information elements includes information about the control apparatus that controls each of the switches, and
wherein the topology management apparatus selects a packet used for managing the network topology on a basis of information about the control apparatus.

6. The communication system according to claim 1, wherein, in place of the instruction for causing each of the switches to distinguish the link layer discovery protocol packet of the first network from the link layer discovery protocol packet of the second network different from the first network and to perform the processing, the control apparatus sets another instruction, which causes said each of the switches to forward a link layer discovery protocol packet to the predetermined topology management apparatus, and
wherein the topology management apparatus determines whether a link layer discovery protocol packet is of the first network or the second network and manages the network topology configured by the group of switches.

7. The communication system according to claim 1, wherein the control apparatus serves as the topology management apparatus.

8. The communication system according to claim 1, wherein the control apparatus instructs the group of switches to transmit the link layer discovery protocol packet of the first network.

9. The communication system according to claim 5, wherein, in place of the instruction for causing each of the switches to distinguish a link layer discovery protocol packet of the first network from a link layer discovery protocol packet of the second network different from the first network and to perform corresponding predetermined processing, the control apparatus sets another instruction, which causes said each of the switches to forward a link layer discovery protocol packet to the predetermined topology management apparatus, and
wherein the topology management apparatus determines whether a link layer discovery protocol packet is of the first network or the second network and manages the network topology configured by the group of switches.

10. The communication system according to claim 4, wherein, in place of the instruction for causing each of the switches to distinguish a link layer discovery protocol packet of the first network from a link layer discovery protocol packet of the second network different from the first network and to perform corresponding predetermined processing, the control apparatus sets another instruction, which causes said each of the switches to forward a link layer discovery protocol packet to the predetermined topology management apparatus, and
wherein the topology management apparatus determines whether a link layer discovery protocol packet is of the first network or the second network and manages the network topology configured by the group of switches.

11. The communication system according to claim 3,
wherein the control apparatus causes each of the switches to distinguish the link layer discovery protocol packet of the first network on a basis of information about the corresponding LLDP transmitting port.

12. The communication system according to claim 3, wherein the controller ID of the predetermined information elements include information about the control apparatus that controls each of the switches, and
wherein the topology management apparatus selects a packet used for managing the network topology on a basis of information about the control apparatus.

13. The communication system according to claim 4, wherein the controller ID of the predetermined information elements includes information about the control apparatus that controls said each of the switches, and
wherein the topology management apparatus selects a packet used for managing the network topology on a basis of information about the control apparatus.

14. The communication system according to claim 2, wherein, in place of the instruction for causing each of the switches to distinguish a link layer discovery protocol packet of the first network from a link layer discovery protocol packet of the second network different from the first network and to perform corresponding predetermined processing, the control apparatus sets another instruction, which causes said each of the switches to forward a link layer discovery protocol packet to the predetermined topology management apparatus, and
wherein the topology management apparatus determines whether a link layer discovery protocol packet is of the first network or the second network and manages the network topology configured by the group of switches.

15. The communication system according to claim 3, wherein, in place of the instruction for causing each of the switches to distinguish a link layer discovery protocol packet of the first network from a link layer discovery protocol packet of the second network different from the first network and to perform corresponding predetermined processing, the control apparatus sets another instruction, which causes said each of the switches to forward a link layer discovery protocol packet to the predetermined topology management apparatus, and
  wherein the topology management apparatus determines whether a link layer discovery protocol packet is of the first network or the second network and manages the network topology configured by the group of switches.

16. A network topology management method, comprising:
  setting an instruction, which causes each switch in a group of control target switches to distinguish a link layer discovery protocol (LLDP) packet of a first network from a link layer discovery protocol packet of a second network different from the first network and to perform a processing, in each control target switch;
  causing the switches to transmit a link layer discovery protocol packet of the first network to a predetermined topology management apparatus in accordance with the instruction set by a control apparatus; and
  managing a network topology configured by the group of switches on a basis of information included in the link layer discovery protocol (LLDP) packet of the first network received from each of the switches,
  wherein the link layer discovery protocol (LLDP) packet of the first network includes predetermined information elements including:
    an identification flag that indicates whether a corresponding LLDP transmitting port and a switch are control targets of the control apparatus;
    a controller ID including an ID of the control apparatus that transmits the instruction for transmitting the LLDP packet is stored; and
    a data path ID (DPID) that is set in a port of a switch that transmits the LLDP packet.

17. A control apparatus, comprising:
  a setting unit configured to set an instruction, which causes each switch in a group of control target switches to distinguish a link layer discovery protocol (LLDP) packet of a first network from a link layer discovery protocol packet of a second network different from the first network and to perform a processing, in said each control target switch,
  wherein the control apparatus causes the group of switches to transmit the link layer discovery protocol (LLDP) packet of the first network to a predetermined topology management apparatus,
  wherein the control apparatus causes the predetermined topology management apparatus to manage a network topology configured by the group of switches on a basis of information included in the link layer discovery protocol packet of the first network received from said each of the switches, and
  wherein the link layer discovery protocol (LLDP) packet of the first network includes predetermined information elements including:
    an identification flag that indicates whether a corresponding LLDP transmitting port and a switch are control targets of the control apparatus;
    a controller ID including an ID of the control apparatus that transmits the instruction for transmitting the LLDP packet is stored; and
    a data path ID (DPID) that is set in a port of a switch that transmits the LLDP packet.

18. The control apparatus according to claim 17, wherein each link layer discovery protocol packet of the first network comprises a packet including the predetermined information elements in addition to information elements included in the link layer discovery protocol packet of the second network.

19. The control apparatus according to claim 18, wherein the DPID in the predetermined information elements includes an identifier uniquely given to a physical switch and a virtual switch, and
  wherein the topology management apparatus manages the network topology in which the physical switch and the virtual switch are included.

20. The control apparatus according to claim 19, wherein wherein the control apparatus causes each of the switches to distinguish the link layer discovery protocol packet of the first network on a basis of information about the port.

* * * * *